(No Model.)
J. D. MANSEAU.
VETERINARY MEDICINE SPOON.
No. 537,695. Patented Apr. 16, 1895.
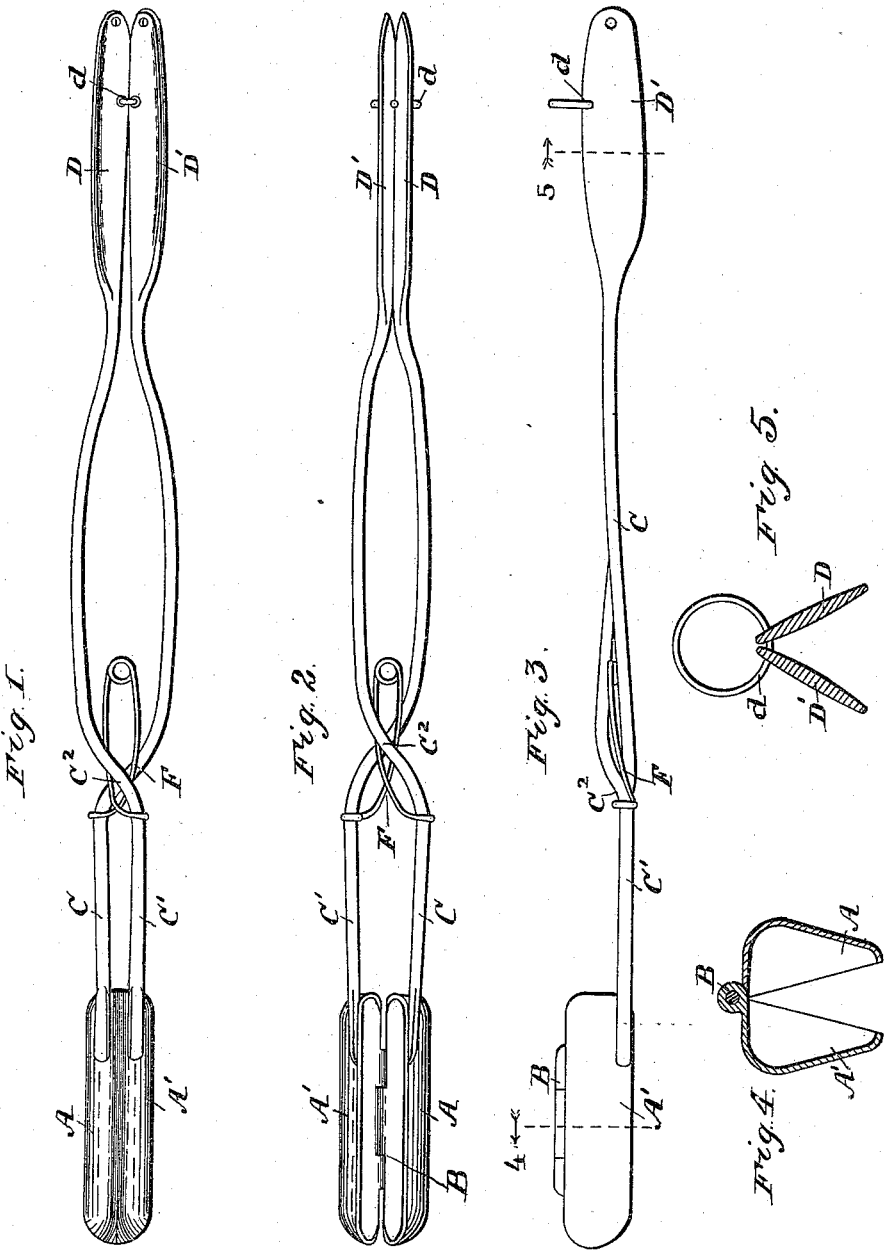

UNITED STATES PATENT OFFICE.

JOHN D. MANSEAU, OF NEW BEDFORD, ASSIGNOR TO CHARLES A. KILHAM, OF ALLSTON, AND WILLIAM H. PRESTON, OF ASHMONT, MASSACHUSETTS.

VETERINARY MEDICINE-SPOON.

SPECIFICATION forming part of Letters Patent No. 537,695, dated April 16, 1895.

Application filed August 31, 1894. Serial No. 521,820. (No model.)

*To all whom it may concern:*

Be it known that I, JOHN D. MANSEAU, a citizen of the United States, residing at New Bedford, in the county of Bristol and State of Massachusetts, have invented certain new and useful Improvements in Veterinary Medicine-Spoons; and I do hereby declare the following to be a full, clear, and exact description of the invention, such as will enable others skilled in the art to which it appertains to make and use the same, reference being had to the accompanying drawings, and to letters of reference marked thereon, which form a part of this specifiction.

The present invention relates to an improved medicine spoon designed for use in veterinary practice for the administration of medicine to horses, cattle or other animals, and the object in view is to provide a spoon having a closed bowl which will admit of medicine being administered in a powdered form if desired and which will deposit the medicine in the animal's mouth so far in that it is impossible for him to reject any of it.

The invention consists of a spoon having a lobate bowl or receptacle formed of two lobes adapted to close against each other and form a closed receptacle for the medicine. The lobes are provided with handles by means of which the bowl can be inserted and at the proper time opened to deposit the medicine within the throat of the animal.

In the accompanying drawings:—Figure 1 is a bottom view of the spoon with the bowl closed. Fig. 2 is a similar view with the bowl open. Fig. 3 is a side elevation of the device; and Figs. 4 and 5 are transverse sections through the bowl and the handles on the lines 4 and 5 respectively.

A A' are two elongated lobes connected by a hinge B along their upper edges and having the rod handles C C' attached respectively to the bottom edges of the lobes. These rod handles are deflected laterally so as to cross each other at the point C², and then extend backward far enough to give a suitable length of handle for use in handling the spoon. At the rear ends the rods terminate in flat end plates, D D', which plates are normally inclined with respect to each other as illustrated by the sectional view Fig. 5. The upper edges of these plates touch and are linked together by a ring d forming a hinge upon which these plates turn and shut together when the handle is compressed.

F is a spring engaging the rods C C' and adapted to draw them together for closing the bowl.

The spoon may be made of any material suited for the purpose and its operation is briefly as follows: The plate ends, D D', of the handles when grasped in the hand and compressed close together, as illustrated by Fig. 2, the contact edges of the handle plates being approximately in line with the hinge B, and the lobes of the bowl open. The medicine having been introduced into the bowl the pressure of the hand is relaxed and the bowl automatically closes. It is then introduced into the throat of the animal with the hinge of the bowl uppermost, and by compressing the handles the lobes open and discharge their load. The lobes of the bowl close tight enough to retain any medicine, fluid or dry. It will further be noted that the lobes are of an elongated form presenting a comparatively small cross section with ample capacity for the medicine, and that the bowl when open to its full width is not materially enlarged in sectional area. Hence irritation to the animal and coughing are avoided. The spoon admits of being used with one hand thus leaving the other hand free for use in controlling the animal, and further as the spoon opens laterally and presents an open or free end when open, none of the powder deposited in the animal's throat is caught by the edge of the spoon and drawn outward, but it all remains where deposited.

What I claim as my invention is—

1. A veterinary medicine spoon having a closed bowl formed of two elongated lobes hinged along the upper edges thereof with handles extending back parallel with the hinge, substantially as and for the purpose set forth.

2. A veterinary medicine spoon having a closed bowl formed of two hinged lobes with spring closed handles connected therewith, said handles having flat ends set obliquely with respect to each other and adapted when compressed to open the bowl, substantially as set forth.

3. A veterinary medicine spoon having a closed bowl formed of two elongated lobes hinged along the upper edges thereof, with crossed spring-closed handles extending back parallel with the hinge, said handles having flat ends set obliquely with respect to each other and adapted when compressed to open the bowl, substantially as set forth.

In testimony whereof I affix my signature in presence of two witnesses.

JOHN D. MANSEAU.

Witnesses:
WILLIAM B. SMITH,
SUSAN R. GARDNER.